US008666992B2

(12) United States Patent
Serrano et al.

(10) Patent No.: US 8,666,992 B2
(45) Date of Patent: Mar. 4, 2014

(54) PRIVACY PRESERVING METHOD FOR QUERYING A REMOTE PUBLIC SERVICE

(75) Inventors: Jose Antonio Rodriguez Serrano, Grenoble (FR); Florent Perronnin, Domene (FR); Vincent Devin, Seyssinet (FR)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/524,469

(22) Filed: Jun. 15, 2012

(65) Prior Publication Data

US 2013/0339386 A1 Dec. 19, 2013

(51) Int. Cl.
*G06F 7/00* (2006.01)
*G06F 17/30* (2006.01)

(52) U.S. Cl.
USPC .......................................... 707/748; 707/758

(58) Field of Classification Search
None
See application file for complete search history.

(56) References Cited

U.S. PATENT DOCUMENTS

| 7,392,391 | B2 | 6/2008 | Eibach et al. |
| 7,774,831 | B2 | 8/2010 | Kuznetsov et al. |
| 7,809,722 | B2 * | 10/2010 | Gokturk et al. ............... 707/736 |
| 8,165,354 | B1 * | 4/2012 | Zhao ............................ 382/118 |
| 8,306,920 | B1 | 11/2012 | Lynch |
| 2003/0021481 | A1 * | 1/2003 | Kasutani ....................... 382/218 |
| 2006/0253491 | A1 * | 11/2006 | Gokturk et al. ............ 707/104.1 |
| 2007/0005356 | A1 | 1/2007 | Perronnin |
| 2007/0258648 | A1 | 11/2007 | Perronnin |
| 2008/0069456 | A1 | 3/2008 | Perronnin |
| 2008/0071814 | A1 * | 3/2008 | Mittal et al. .................. 707/101 |
| 2008/0317358 | A1 | 12/2008 | Bressan |
| 2009/0144033 | A1 | 6/2009 | Liu et al. |
| 2009/0228514 | A1 * | 9/2009 | Liu et al. ....................... 707/102 |
| 2010/0040285 | A1 | 2/2010 | Csurka et al. |
| 2010/0092084 | A1 | 4/2010 | Perronnin et al. |
| 2010/0189354 | A1 | 7/2010 | de Campos et al. |
| 2010/0191743 | A1 | 7/2010 | Perronnin et al. |
| 2010/0226564 | A1 * | 9/2010 | Marchesotti et al. ......... 382/159 |
| 2010/0318477 | A1 | 12/2010 | Perronnin et al. |
| 2011/0026831 | A1 | 2/2011 | Perronnin et al. |
| 2011/0052063 | A1 | 3/2011 | McAuley et al. |
| 2011/0091105 | A1 | 4/2011 | Perronnin |
| 2011/0131241 | A1 * | 6/2011 | Petrou et al. ................. 707/770 |
| 2011/0184950 | A1 | 7/2011 | Skaff et al. |
| 2011/0202543 | A1 * | 8/2011 | Chin et al. .................... 707/749 |
| 2012/0045134 | A1 | 2/2012 | Perronnin et al. |
| 2012/0076401 | A1 | 3/2012 | Sanchez et al. |
| 2012/0173549 | A1 * | 7/2012 | Bouguet et al. ............... 707/749 |

OTHER PUBLICATIONS

Scan, Trusted ICT Security Solution Provider. http://www.scan-associates.net/product_securedoc.htm—accessed Jan. 20, 2011, pp. 1-2.

(Continued)

*Primary Examiner* — Tony Mahmoudi
*Assistant Examiner* — Tuan A Pham
(74) *Attorney, Agent, or Firm* — Fay Sharpe LLP

(57) ABSTRACT

A system and a method of querying a remote service without revealing a private document to the remote service are provided. The method includes receiving a signature of a user's private document, and querying an intermediate database with the signature of the private document to generate an intermediate result set comprising intermediate database documents, based on a computation of similarity of the signatures of the intermediate database documents to the signature of the private document. The remote service is queried, based on the intermediate result set and a final result set is received from the remote service based on the query, which can be output to the user or further processed.

21 Claims, 5 Drawing Sheets

(56) References Cited

OTHER PUBLICATIONS

*VaultMate*, Enterprise Privacy Solution, http://www.vaultmate.com/features.php—accessed Jan. 20, 2011, pp. 1-2.
*Public-key Cryptography*, Wikipedia, http://en.wikipedia.orq/wiki/Public_key_encryption—accessed Jan. 20, 2011, pp. 1-12.
*Symmetric-key algorithm*, Wikipedia, http://en.wikipedia.org/wiki/Symmetric_key_algorithm—accessed Jan. 20, 2011, pp. 1-2.
*RSA*, Wikipedia, http://en.wikipedia.org/wiki/RSA—accessed Jan. 20, 2011, pp. 1-11.
*Homomorphic Encryption*, Wikipedia, http://en.wikipedia.org/wiki/Homomorphic_encryption—accessed Jan. 20, 2011, pp. 1-5.
*Optimal Asymmetric Encryption Padding*, Wikipedia, http://en.wikipedia.org/wiki/Optimal_Asymmetric_Encryption_Padding—accessed Jan. 20, 2011, pp. 1-2.
Bellare, et al. "Optimal Asymmetric Encryption—How to encrypt with RSA," Extended abstract in Advances in Cryptology—Eurocrypt '94 Proceedings, Lecture Notes in Computer Science vol. 950, A. De Santis ed, Springer-Verlag, 1995, pp. 1-19.
Shoup. "OAEP Reconsidered," IBM Zurich Research Lab, Saumerstr. 4, 8803 Ruschlikon, Switzerland. Sep. 18, 2001, pp. 1-27.
Jammalamadaka, et al. "Querying Encrypted XML Documents," Proceedings of the 10th International Database Engineering and Applications Symposium, Dec. 11-14, 2006, p. 129-136.
The FIPS 180-2 publication on Secure Hash Algorithms, Aug. 1, 2002, pp. 1-75.
Carminati, et al. "Securing XML data in third-party distribution systems," in Proceedings of the 14th ACM International Conference on Information and Knowledge Management (CIKM), 2005, pp. 99-106.
Wang, et al. "Efficient Secure Query Evaluation over Encrypted XML Database," VLDB Sep. 12-15, 2006, pp. 127-138.
Ünay, et al. "A Survey on Querying Encrypted XML Documents for Databases as a Service," Sigmod Record, Mar. 2008 (vol. 37, No. 1), pp. 12-20.
eXist Open Source Native Database, Configuring Database Indexes, http://exist.sourceforge.net/indexing.html—accessed Jan. 20, 2011, pp. 1-12.
Xindices 1.1, The Apache XML project, Administration Guide, http://xml.apache.org/xindice/guide-administrator.html—accessed Jan. 20, 2011, pp. 1-5.
Schrefl, et al. "SemCrypt-Ensuring Privacy of Electronic Documents Through Semantic-Based Encrypted Query Processing," Proceedings of the 21st International Conference on Data Engineering Workshop, 2005, pp. 1-10.
Perronnin, et al. "Improving the Fisher Kernel for large-scale image classification", ECCV 2010, Part IV, LNCS 6314, pp. 143-156.
Lowe, D. "Distinctive Image Features from Scale-Invariant Keypoints", IJCV 2004, vol. 60, pp. 1-28.
Perronnin, at al. "Fisher Kernels on Visual Vocabularies for Image Categorization", CVPR 2007, pp. 1-8.
Sanchez, at al. "High-dimensional Signature compression for Large-Scale Image Classification", CVPR 2011, pp. 1665-1672.
Csurka, et al. "Visual categorization with bags of keypoints", ECCV 2004, pp. 1-16.
Perronnin, et al. "Adapted vocabularies for generic visual categorization" ECCV 2006, pp. 464-475.
Jegou, et al. "Hamming embedding and weak geometric consistency for large scale image search" ECCV 2008, pp. 304-317.
Zheng, et al. "Tour the World: building a web-scale landmark recognition engine", IEEE Computer Society Conf. 2009, pp. 1-8.
Jegou, et al. "Improving bag-of-features for large scale image search", IJCV 2010, pp. 316-336.
Laaksonen, et al. "PicSOM self-organizing image retrieval with MPEG-7 content descriptions", IEEE Transactions on Neural Networks, vol. 13, No. 4, 2002, pp. 841-853.
Chum, et al. "Total Recall: Automatic Query Expansion with a Generative Feature Model for Object Retrieval", ICCV 2007, pp. 1-8.
Hays, et al. "IM2GPS: estimating geographic information from a single image", CVPR 2008, pp. 1-8.
Kaneva, et al. "Infinite Images: Creating and Exploring a Large Photorealistic Virtual Space", IEEE 2010, vol. 98, No. 8, pp. 1391-1407.
Lu, et al. " Security analysis for privacy preserving search of multimedia", 2010 IEEE $17^{th}$ Intl. Conf. on Image Processing, Sep. 2010, pp. 2093-2096.
Shashank, et al. "Private Content Based Image Retrieval", CVPR 2008, pp. 1-8.
Torralba, et al. "80 million tiny images: a large dataset for non-parametric object and scene recognition", IEEE Transactions on Pattern Analysis and Machine Intelligence, Nov. 2008, pp. 1958-1970.
Whyte, et al. "Get out of my Picture! Internet-based Inpainting", British Machine Vision Conference, 2009, pp. 1-11.
Douze, et al. "Combining attributes and Fisher vectors for efficient image retrieval" CVPR 2011, Jun. 20, 2011, pp. 745-752.
McGee, M. "Up Close with Google's Search by Image: Hits, Misses & More" Jun. 17, 2011, pp. 1-11, Retrieved from http://searchengineland.com/up-close-with-google-search-by-imaqe-82313 on Sep. 13, 2013.
Wikipedia. "Fisher Kernel" Feb. 23, 2012, pp. 1-2, Retrieved from http://en.wikipedia.org/w/index.php?title=Fisher_kernel&oldid=483539599 on Sep. 13, 2013.

* cited by examiner

PRIVACY PRESERVING METHOD FOR QUERYING A REMOTE PUBLIC SERVICE

BACKGROUND

The exemplary embodiment relates to exchanging data with remote services such as multimedia databases and finds application when querying a database with a document which it is desired to maintain private.

In a typical remote service architecture, a user submits digital material to the remote service which processes the material and returns a result to the user. The business application architecture may vary depending on, for example, the service offered, the client device, and the bandwidth available between them. A remote service may be a web service which offers an interface to upload documents and download the results of processing them. For example, a user may submit an image to a remote service to find similar images. Another example is a mobile phone application which allows a user to submit captured images or sounds to a server which uses its increased processing power to process the data and send the results back to the device. Examples of remote services are image categorization, image retrieval (similar image search), product identification from images, music song identification from audio, and other services which accept other input formats (e.g., video).

Remote services raise privacy concerns when data to be uploaded is personal or confidential. For example, users of an image search service may refrain from submitting pictures in which they or their family appear. Similarly, a professional photographer may want to use an image search engine to check the originality of a photograph, but may hesitate to submit the photograph to an untrusted source. Similarly, a musician may be hesitant to submit a new composition to a music search engine.

Remote services could remedy this problem by providing privacy policies and by encrypting submitted data, but this is usually not the case as remote service providers generally benefit from acquiring the input data in order to improve their algorithms, augment their databases, or extract statistical information.

Because most public web services do not implement privacy-preserving mechanisms, there remains a need for a system which allows a user to query a web service without revealing a private document.

BRIEF DESCRIPTION

In one aspect of the exemplary embodiment, a method of querying a remote service without revealing a private document to the remote service includes receiving a signature of a user's private document, and querying an intermediate database with the signature of the private document to generate an intermediate result set comprising intermediate database documents, based on a computation of similarity of the signatures of the intermediate database documents to the signature of the private document. The remote service is queried based on the intermediate result set and a final result set is received from the remote service based on the query. One or more of the steps of the method may be implemented by a computer processor.

In another aspect, a computer implemented querying system includes a signature generator for generating a signature for a user's private document. A similarity service receives the generated signature of the private document and queries an intermediate database with the generated signature to produce an intermediate result set comprising documents. A submitting component submits the intermediate result set to an associated remote service for producing a final result set based on the intermediate result set. At least one processor which implements the signature generator and similarity service.

In another aspect, a method of querying a remote service for results similar to results which would be produced by querying the remote service with a private document without revealing the private document to the remote service includes querying a similarity service with the private document and receiving an intermediate result set comprising documents from the similarity service. The method further includes querying the remote service with a query set derived from the intermediate result set and receiving and outputting a final result set of documents. One or more of the steps of the method may be implemented by a computer processor.

DETAILED DESCRIPTION

The exemplary embodiment relates to a system and method for querying a remote public service using proxy documents similar to a private document. Aspects of the exemplary embodiment provide for creating a signature of the private document based on features extracted from the private document.

In one exemplary embodiment, an intermediate database is used to retrieve one or more documents that are similar to a user's private document. The retrieved documents (or a subset of the documents) are then submitted to a remote service. The results are then returned to the user, either directly or by the intermediate database. The results are similar to the results that would have been obtained by using the private document directly, but, advantageously, the private document is never processed by the remote service.

The remote service is of the type where a user submits digital material, such as an image, and the service processes the material and returns a result to the user. For example, a user may submit an image to a remote service to find similar images. Since the user may prefer not to submit private images or documents to a service that has no guarantee of maintaining the privacy of the document, to maintain the privacy of the document, the private document is first submitted to a trusted intermediate database. The intermediate database returns similar documents which may be then submitted to the public remote service as a proxy for the private document. This allows a user to query the public remote service for documents similar to the private document without revealing the private document.

Figure 1:
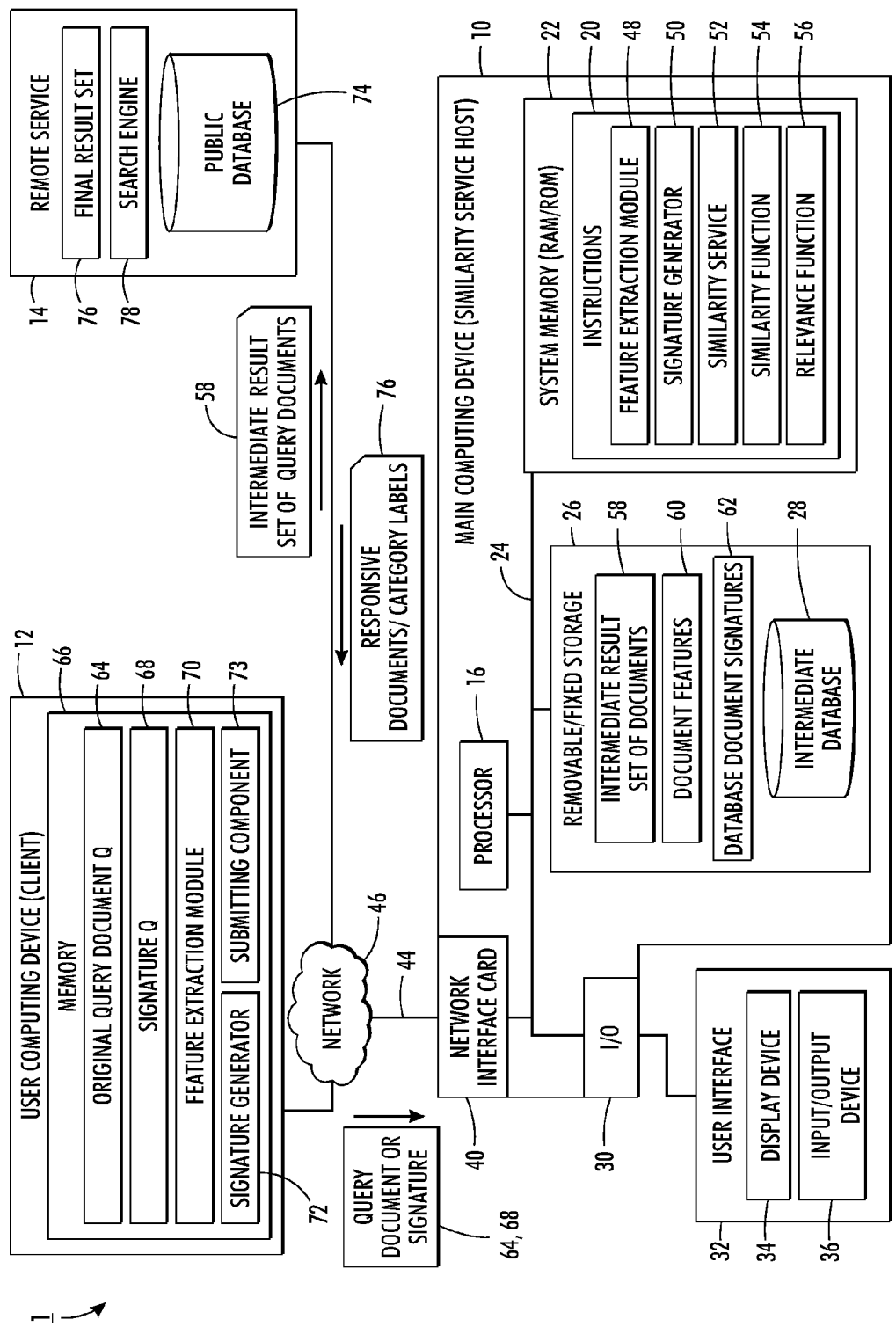
FIG. 1 is a functional block diagram of a system for querying a public database according to one aspect of the exemplary embodiment.

With reference to FIG. 1, a functional block diagram of a computer-implemented document retrieval system 1 suitable for performing the exemplary method disclosed herein is shown. As will be appreciated, the separate computer systems may be configured and arranged differently to parallelize the retrieval system or combine components. The illustrated retrieval system includes a main computing device 10, a user computing device (client) 12, and a remote service 14. The main computing device 10 includes a processor 16 which controls the overall operation of the computing device 10 by execution of processing instructions 20 which are stored in a memory 22 connected to the processor 16 by a bus 24. For example, the instructions 20 may be configured for performing the exemplary method outlined in FIG. 2. The processor 16 is also communicatively connected to a storage unit 26 which may be removable or fixed and may store data during processing.

An intermediate database 28 of documents is stored in memory 26 of main computing device 10 and/or on one or more remote computing devices that are accessible to the system. The documents of the intermediate database 28 need not be labeled (e.g. by subject matter), which simplifies construction of the intermediate database 28. For example, an intermediate database of image documents could be constructed by simply crawling the web.

Main computing device 10 also includes one or more interfaces to connect to external devices. These may include an input output (I/O) interface 30 in communication with a user interface 32. The user interface 32 may include one or more of a display device 34 for displaying information to users, such as an LCD screen, and a user input device 36, such as a keyboard or touch or writable screen, and/or a cursor control device, such as a mouse, trackball, or the like, for inputting instructions and communicating user input information and command selections to the processor 16. Main computing device 10 also includes a network interface controller (NIC) 40. The NIC 40 links the main computing device 10 with external computing systems, such as the illustrated user computing device 12 and remote service 14. The NIC 40 may connect to these components via a wired or wireless link 44. The link 44 connects the main computing device to a network 46 which may be a local area network (LAN) or a wide area network (WAN) such as the Internet.

The user computing device 12 and remote service 14 may be hosted on remote computing systems similarly configured to the main computing device 10, i.e., which may include memory and a processor. The details of these machines are omitted for brevity. The main computing device 10, user computing device 12, and remote service 14 may each include a PC, such as a desktop, a laptop, palmtop computer, scanner, portable digital assistant (PDA), server computer, cellular telephone, pager, or other computing device or devices capable of executing instructions for performing the exemplary method or methods described herein.

The system memory 22 and storage 26 may be separate or combined and may represent any type of non-transitory computer readable medium such as random access memory (RAM), read only memory (ROM), magnetic disk or tape, optical disk, flash memory, or holographic memory. In one embodiment, the memory 22 and storage 26 comprise a combination of random access memory and read only memory. In some embodiments, the processor 16, memory 22, and/or storage 26 may be combined in a single chip. The NIC 40 may communicate with other devices via computer network 46 and may comprise a modulator/demodulator (MODEM) or an adapter for a physical network such as Ethernet. The processor 16 can be variously embodied, such as by a single core processor, a dual core processor (or more generally by a multiple core processor), a digital processor and cooperating math coprocessor, a digital controller, or the like.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpreted code, object code, directly executable code, and so forth. It is contemplated that the software may invoke system-level code or calls to other software residing on the server or other location to perform certain functions.

The instructions 20 for implementing the exemplary method may include various software components, such as a feature extraction module 48, a signature generator 50, a similarity computing service 52, which may utilize a similarity function 54, and optionally, a relevance function 56.

Data, in the form of an intermediate result set 58 of documents from the intermediate database, and extracted features 60, and/or signatures 62 of the intermediate database documents, may be stored locally in removable/fixed storage, such as the intermediate database 28. A user provides, via the user computing device 12, a user document Q 64. The user document Q 64 is a private document containing sensitive information that the user may not wish to submit to a non-trusted public remote service.

The user computing device 12 may include memory 66 which stores the query document Q 64 and/or information extracted therefrom. The extracted information may include features extracted from the document 64 and/or a signature 68 generated from the extracted features. The memory 66 may also include a feature extraction module 70 and a signature generator 72, analogous to the feature extraction module 48 and signature generator 50, for extracting the features and generating the signature 68 therefrom, respectively. In other embodiments, the query document 64, itself, is sent via the network 46 to the main computing device 10 to be processed by the feature extraction module 48 and signature generator 50, for extracting the features and generating the signature 68 therefrom, respectively. The user computing device, and/or the main computing device may include a submitting component 73 for submitting the intermediate result set to the remote service. In the case of the main computing device, this may be a part of the similarity service 52.

The remote service 14 may be a public service in that there is no guarantee of the privacy of submitted documents. The remote service may host in memory thereof a public database 74 which includes a collection of documents. These documents may be of the same format as the input documents 58, such as images, text, sound, or multimedia documents which are a combination of two or more of these types. Remote service 14 receives query documents and returns a result set, such as responsive documents, labels, and/or other information 76 via network 46. The public database 74 is public in that any document contained in the database may be returned. When queried, it may return a final result set 76 including one or more responsive documents from the database 74 that the service identifies as responsive to the query, or information extracted from these documents. In one embodiment, the public database 74 is itself not publicly accessible; that is, it is not directly accessible to the public by, for example, a simple query language, though such an architecture is also contemplated. For example, the remote service 14 is accessed by a web interface, which receives an input query, such as a query comprising the intermediate result set 58. The query is processed by a search engine 78 which, in turn, interacts with the public database 74 to retrieve responsive documents 76. In some embodiments, one or both of the intermediate database 28 and public database 74 may be hosted on separate computing devices distinct from the respective main computing device 10 and remote service. As will be appreciated, the databases may each be hosted by multiple computing devices in order to parallelize database operations.

The exemplary documents processed by the system 1, including the query document 64, intermediate database documents 58, and public database documents 76, may each include one or more of an image, a sound recording, text, a video, or a combination thereof. An image, as used herein, may be input in any convenient file format, such as JPEG, GIF, JBIG, BMP, TIFF, PDF, or the like or other common file format used for images and which may optionally be converted to another suitable format prior to processing. In general, each input digital image includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). Text documents may be received in Word, PDF, or other convenient file format for text documents. PDF or scanned documents may be processed with an optical character recognition (OCR) engine to extract the text prior to signature generation.

The feature extraction module 48 or 70 is used to extract features 60 from the query document Q 64, which are used by the signature generator 50 or 72 to generate a representation (or "signature") 68 of the document 64, denoted by q. The signature q may be in the form of a multidimensional vector (or vectors) of values. The multidimensional vector may be of a fixed number of dimensions. The signature may be a statistical representation of the features 60 extracted from the document. The features can be low level visual features extracted from patches of an image, in the case of image document or, in the case of text documents, features based on word frequencies can be employed. Methods for computing signatures for images and text documents are described below. For example, an image signature may include or be based on a Fisher vector, as described in "Improving the Fisher kernel for large-scale image classification," F. Perronnin, J. Sanchez, and T. Mensink, ECCV 2010. Reconstructing an input document from a signature such as the Fisher vector is not possible, since the signature aggregates (e.g., averages and/or concatenates) statistics computed at the patch level, making the signature similar to an encrypted document in that the original document cannot be deduced from the signature.

Because most remote services only accept raw documents as input, the signature q 68 cannot be directly submitted to the remote service 14. Instead, the signature q 68 is submitted to the similarity service 52. The similarity service 52 queries the intermediate database 28 with the document signature 68 to retrieve similar document(s) to Q 64. In particular, the similarity service 52 computes a comparison (which can be a similarity or distance, both of which are referred to as similarity for convenience) between the signature q 68 and the intermediate database document signatures 62, which may have been extracted from the respective database documents in a similar manner to the extraction of the document signature. The intermediate result set 58 may comprise, for example a subset of the documents from the intermediate database 28 having the top K most similar signatures, where K may be a suitable number, such as from 1 to 50, or up to 20, depending on the size of the database. In other embodiments, the retrieved intermediate documents 58 include those which have at least a threshold similarity for their signatures. This process effectively transforms the signature 68 into a form 58 that can be submitted to the remote service to yield results similar to submitting the private query document Q 64.

In one embodiment, the intermediate database 28 is hosted on the main computing device 10, and the user device 12 interacts with the similarity service 52 hosted on the main computing device 10 which in turn queries the intermediate database 28. In one embodiment, the main computing device 10 does not receive the original document Q 64, only its signature 68 or extracted features 60, and therefore cannot compromise the privacy of Q 64. In other embodiments, the main computing device 10 receives the query document 64 and generates the signature 68, making sure that the document 64 is not among those sent to the remote service 14 as part of the query documents 58. In yet other embodiments, the main computing device 10 and user computing device 12 are the same computing device.

The user computing device 12 can serve as a client in a client/server architecture. The user device 12 is a client of both the similarity service 52 and, indirectly, the public remote service 14.

The intermediate documents 58 identified by the similarity service may be provided to the user computing device 12 (if it is separate to the main computing device 10) for submission to the remote service 14. In another embodiment, the main computing device submits the query documents 58 and receives the final result set 76 or instructs the remote service to send the final result set 76 directly to the user computing device. In one embodiment, the final result set 76 may be processed by the main computing device and a subset of the documents, or information extracted therefrom, returned to the user. For example, the user may request that the similarity service 52 informs the user when any images uploaded to the public database are similar to an image that the user has created. In this case, the service may not provide the image 76 itself. Rather, the user is simply informed that an image has been posted. In other embodiments, the information provided to the user may be URLs or other location information which allows the user to retrieve or view the images in the results set 76.

The intermediate database 28 may contain a set of documents (not shown) with their corresponding pre-computed signatures 62.

Figure 2:
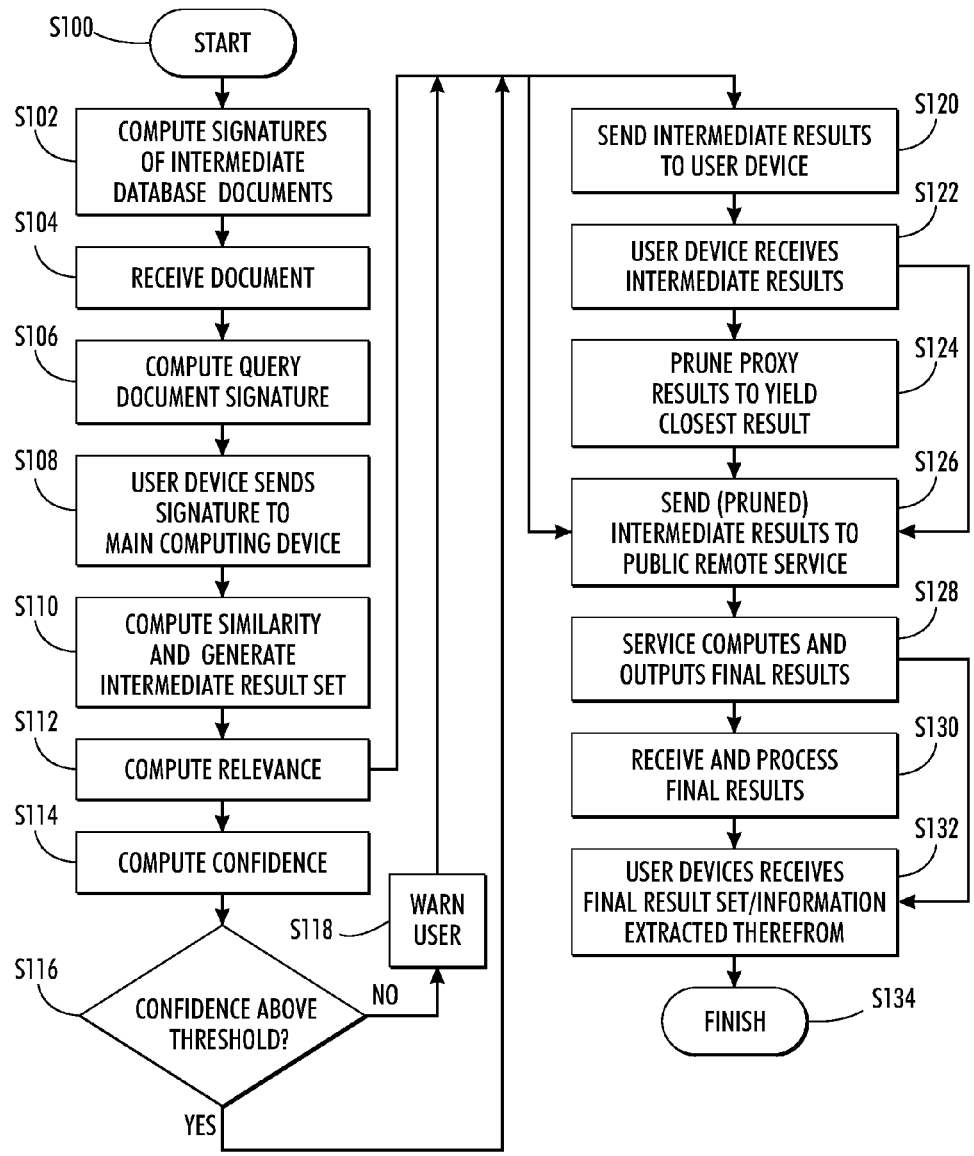
FIG. 2 is a flow chart illustrating a querying method according to another aspect of the exemplary embodiment.

With reference to FIG. 2, an exemplary method is illustrated which can be performed with the system of FIG. 1. The process starts at S100.

At S102, signatures for documents in the intermediate database 28 are computed by the signature generator 50 (and feature extractor). This may be an offline process, performed before a query document 64 is received. Let $x_i$ be the N-dimensional signature 62 of the ith document of the database 28. It has been shown that, given a large enough dataset (e.g., millions or tens of millions) of images, it is feasible to retrieve similar images to virtually any query. As the size of the intermediate dataset grows, relative similarity of the result documents 58 and the loss of quality due to the approximation will decrease. As an example, given an image of a landmark with persons in the foreground, the system 1 is able to retrieve other images of the same landmark but possibly with different persons or with no persons. Text documents with similar content can also be matched with high precision.

At S104, an original query document Q 64 is received, which may be provided to the user computing device/main computing device by conventional means.

At S104, a signature 68 is generated for the original query document 64. In particular, feature extraction module 70 or 48 extracts features from the document which are processed by signature generator 72, 50 to generate an N-dimensional signature 68 for Q 64. After the signature has been generated, the original query document Q 64 is no longer accessed, preserving its privacy, and may be discarded.

At S108, the signature 68 may be sent from the user device to the main computing device, which hosts the similarity service 52 and intermediate database 28. In an alternative embodiment, the query document Q 64 itself is sent to the main computing device and the main computing device computes the signature 68.

At S110, using the pre-defined similarity function s (54), the similarity s(q,$x_i$) between the query signature q and each of the signatures $x_i$ in the intermediate database is computed, e.g., by the similarity service 54. In one embodiment, s(q,$x_i$) is a function of the distance from q to $x_i$. One way to compute the distance is the square root of the sum of the squares of the differences of each vector element of q and $x_i$. Note that, for computational simplicity, it may not be necessary to calculate the square or root, using only the sum of the absolute values of the distances or the sum of the squares of the distances. A small distance corresponds to a high similarity.

Other exemplary distance measures such as a kernel function, between the signature 68 of the original query image 64 and the signatures 62 of the database images are also contemplated. An exemplary kernel is a linear kernel, such as the dot product, although other similarity measures are also contemplated, such as the L1 distance, chi-squared distance, cosine similarity or the like may be used. The selection of a suitable similarity/distance measure may depend, in part, on the type of signatures used.

Documents corresponding to signatures having a high similarity to (small distance from) the query signature q are selected to produce an intermediate result set 58 of similar documents. For example, the K highest similarity (lowest distance) documents having a similarity above a threshold (that is, a distance below a threshold) may be selected. The similar documents of the intermediate result set 58 will be denoted by $D_1, \ldots, D_K$.

At S112, a relevance factor which represents the relevance of each document $D_k$ with respect to the query signature q 68 may be computed and/or stored. The relevance factor may be a scalar value denoted $r_k$. The relevance factor may be, for example, the rank of $D_k$ when $D_1, \ldots, D_K$ are ordered by similarity s(q,$x_k$). In another embodiment, the relevance factors of the similar documents 58 are the coefficients that optimize (e.g., minimize) an error equation, described below.

The set of documents $D_1, \ldots, D_K$ and their respective relevance factors $r_k$ can be used as an encrypted representation of the private query document Q 64 in the document space, in that they produce a result similar to using Q while maintaining the privacy of Q. As will be appreciated, it is not possible to reconstruct Q given $D_1, \ldots, D_K$, even if $D_1, \ldots, D_k$ are revealed and understandable by a human. This is similar to the concept of a "public key", in which case $D_1, \ldots, D_k$ (together with their relevance factors $r_k$) would represent a public key in the document space.

The method then proceeds to S114 or to S120 or S126.

Optionally, at S114, a confidence in the intermediate result set 58 is calculated, e.g. by the similarity service 52. At S116, a determination is made, e.g., by the similarity service, as to whether the confidence is above a predetermined confidence threshold. If at S116, the confidence is not above the threshold, a notification may be generated at S118 to warn the user and/or the method may be terminated. If the confidence is above the threshold, the method may proceed to S120 or S126 For example, in some instances, it is possible that no document in the intermediate database 28 is close enough to ensure a good approximation of the original query document. In such a case, the similarity service 52 may return a message to the user (through the user computing device 12) indicating that the document 64 cannot be processed privately. In one embodiment, the intermediate result set 58 may be provided to the user with a confidence which indicates how confident the similarity service is that the intermediate result set 58 or at least one or more of the documents in it, is similar to the original query document (i.e., to its signature 68). Below a certain confidence, the user may be advised that the results may not be useful.

For example, let $x_1, \ldots, x_K$ be the signatures of the K most similar (e.g., closest in distance) documents. In this embodiment, the relevance factors $r_1, \ldots r_K$, are the coefficients which minimize the reconstruction error of q 68 (the multidimensional signature of the query document) using a linear combination of $x_1, \ldots, x_K$. The reconstruction error may be computed according to the expression:

$$R = \left\| q - \sum_{k=1}^{K} r_k x_k \right\|^2$$

The relevance factors $r_K$ may thus be the coefficients which allow the linear combination of the signatures of the intermediate result set documents 58 to most closely approximate the signature q of the query document. The reconstruction error R (the error that cannot be eliminated even when the best fit coefficients are chosen) is the confidence.

S116 may then include comparing the residual error (confidence value) to a predetermined value or a value which is a function of the query signatures and the number of signatures. If the confidence value is above this value, then, in step S118 the user is warned that the intermediate result set may not be an acceptable approximation of the query document.

At S120, the documents $D_1, \ldots, D_K$, or a subset of these documents (e.g. the single most similar document or the K most similar documents for some integer n) may be returned to the user device 12 for submission to the remote service 14 in lieu of the private query document q. In another embodiment, the main computing device may proxy for the user device and the method may proceed to S126.

At S122, the user device 12 may receives the intermediate result set 58.

In one embodiment, at S124, the user device 12 may present the intermediate result set to the user, e.g., via a graphical user interface, and allow the user to select the most relevant documents, thereby manually "pruning" the result set to remove poor matches. Alternatively, the user computing device 12 may compare the result set to the original query document q automatically. The user device may also automatically select the best document based on the relevance factors.

In step S126, the (optionally pruned) intermediate result set 58 is sent to the remote service 14, by the submitting component 73. As has been noted, the user's private document 64, or any part of it, is not submitted to the remote service as part of the query.

At S128, the remote service 14 computes the final result set 76 and, at outputs the final result set, which may be returned to the main computing device at S130, for further processing, or directly to the user device at S132. The remote service generally will not be aware of the relevance factors so, at S132, the user device 12 may use the relevance factors to label the final results, or this service may be provided at S130 by the relevance function 56 of the main computing device. After documents $D_1, \ldots, D_K$ 58 are submitted to the remote service 14 and the results $R_1, \ldots, R_K$ are obtained, a function $R=F(R_1, \ldots, R_K, r_1, \ldots, r_K)$ may be computed which produces an output R which combines the results $R_1, \ldots, R_K$ using the relevance factors $r_K$. F represents a function such as an aggregating function. This aggregates the results for all the documents 58 to provide a result for the input query document 64.

In one embodiment, the remote service 14 is a document categorization service and the final result set 76 output at S128 includes category labels for the submitted documents 58. Here, $R_k$ is the category label of document $D_k$. The category label $R_k$ may be a single label or set of probable labels selected from a finite set of possible labels or may be a probabilistic assignment over all labels. F can be a function which counts the number of votes for each category across the results $R_k$, possibly weighted by the relevance factors. In this embodiment, the remote service may include a classifier which has been trained on a labeled set of training documents to assign a label to a new document. Or, the remote service may include a similarity service analogous to the similarity service 52, which identifies similar documents in the database 74 to the intermediate set 58 submitted, retrieves the labels of the database documents, and assigns labels to the submitted documents based on the database document labels and optionally the computed similarity.

In another embodiment, the remote service 14 is a similar document search service, which may perform analogously to the similarity service 52. Here, the final results set $R_k$ 76 output at S128 is a set of documents similar to $D_k$, and function F may select the set of documents with highest similarity values across all $R_k$'s. The combined output thus approximates the output that the user could have obtained by submitting the private query to the remote service.

In one embodiment, the remote service 14 may only perform queries of the database 74 with a single document 58 at a time, in which case there may be multiple result sets returned, one for each submitted document in the intermediate set 58 which are aggregated by the user device/main computing device. For example, the user device 12 or main computing device 10 may receive each result set, tag it with its relevance coefficient, and, once all of the documents of the intermediate step have been submitted and a result set received for each, combine the result sets (tagged with the relevance coefficients) into one result set of documents and relevance factors.

The method ends at S134.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method of FIG. 2.

As will be appreciated form the foregoing, several different architectures are contemplated. For example, rather than sending the intermediate results 58 to the user device at S120, the main computing device serves as a proxy for the user device and submits the result set to the remote service for the user device (at S126). The choice of route may depend on the application. If the user is to prune the result set (step S124 of FIG. 2), then sending the result set to the user may be advantageous. On the other hand, if the intermediate result set will be submitted to the remote service without user intervention, then having the main computing device send the intermediate result set to the service avoids an extra step in the process, i.e., sending the result set from the intermediate database to the user device, only for the user device to then forward it on to the remote service. It may also be useful when the main computing device is querying the remote service frequently for the user, e.g., automatically. In some embodiments, the remote service may place restrictions on who can submit documents 58, which may impact whether the user or the main computing device owners are authorized to send queries 58. Additionally, the ultimate recipient of the results may be a designee of the user, which can be considered to be the user for convenience of description.

Figure 3:
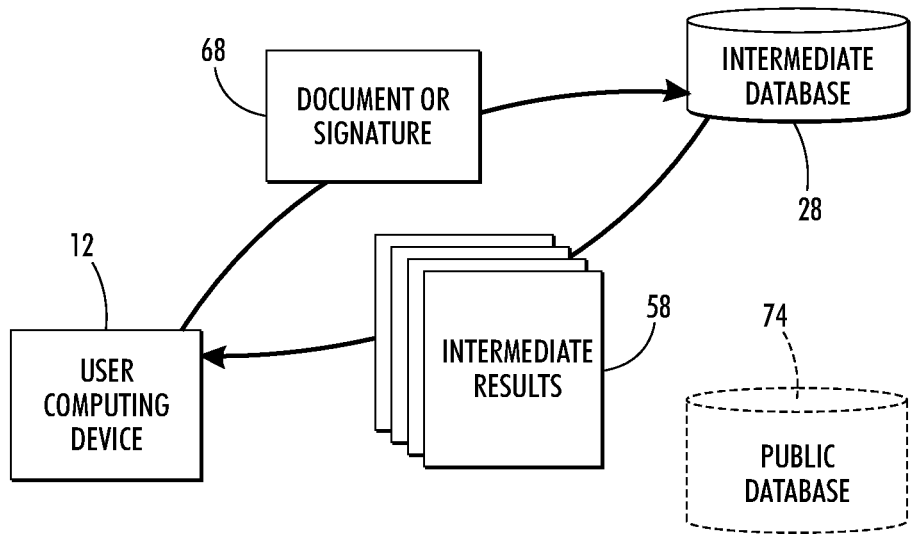
FIGS. 3-7 are functional block diagrams of components and data flow in a system for querying a public database.
Figure 4:
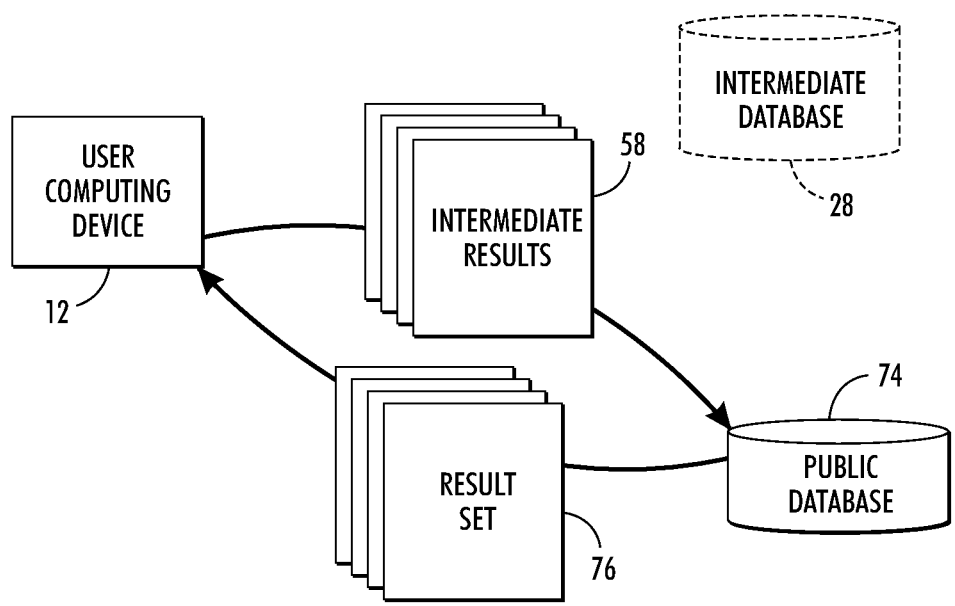

FIGS. 3 and 4 show the communication between the user computing device (the client) 12, the main computing device 10, and the remote service in one embodiment. In this embodiment, the client device 12 has a software module which allows it to communicate directly with the intermediate database 28. That is, the user computing device performs a database query on the intermediate database 28 and also calculates similarity, relevance, and confidence locally. Here, the user computing device and main computing device can be integrated into the same device 12. The user device 12 generates a signature for the private query document Q 64 using local modules 70 and 72. The user computing device queries the intermediate database 28 with the signature 68 and receives the results, as shown in FIG. 3. The user computing device 12 may then calculate similarity, relevance, and confidence and prune the results. As shown in FIG. 4, it then submits the (possibly pruned) intermediate results to the remote service 14 and receives the result set. This embodiment makes use of a user device which has access to the software for performing a query on the intermediate database and which is also able to calculate similarity, relevance, and confidence.

Figure 5:
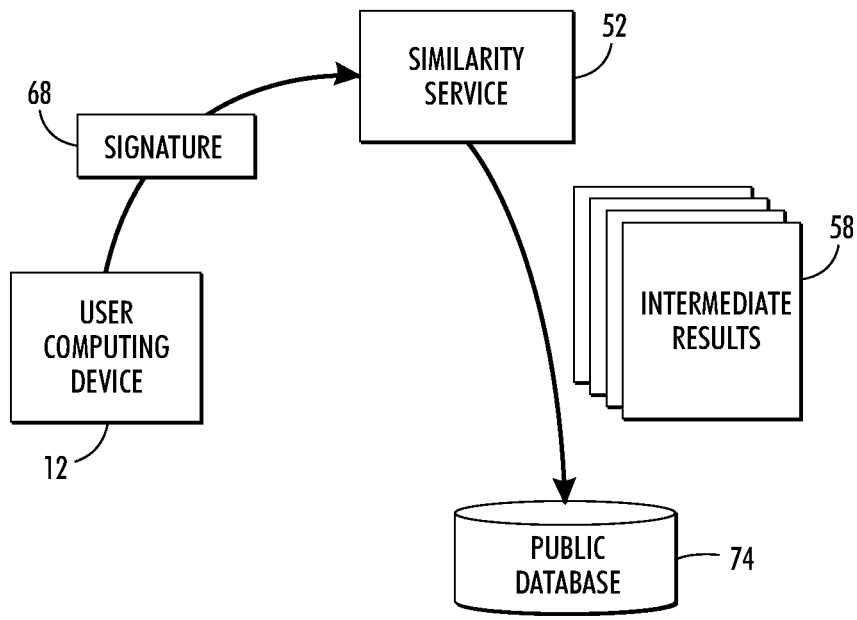
Figure 6:
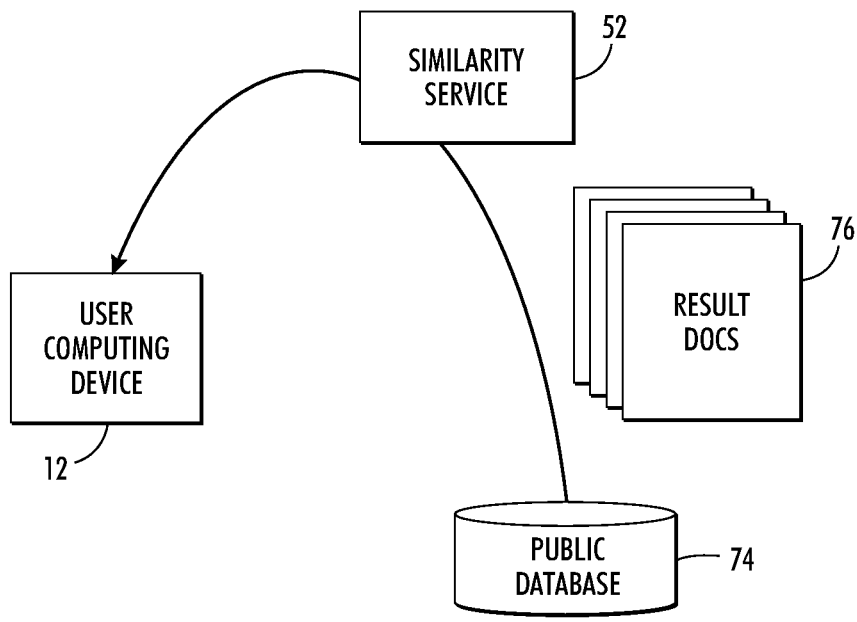

In an alternative embodiment shown in FIGS. 5 and 6, the similarity service 52 submits the document results directly to the remote service, receives the resulting documents, and then forwards them to the client.

Figure 7:
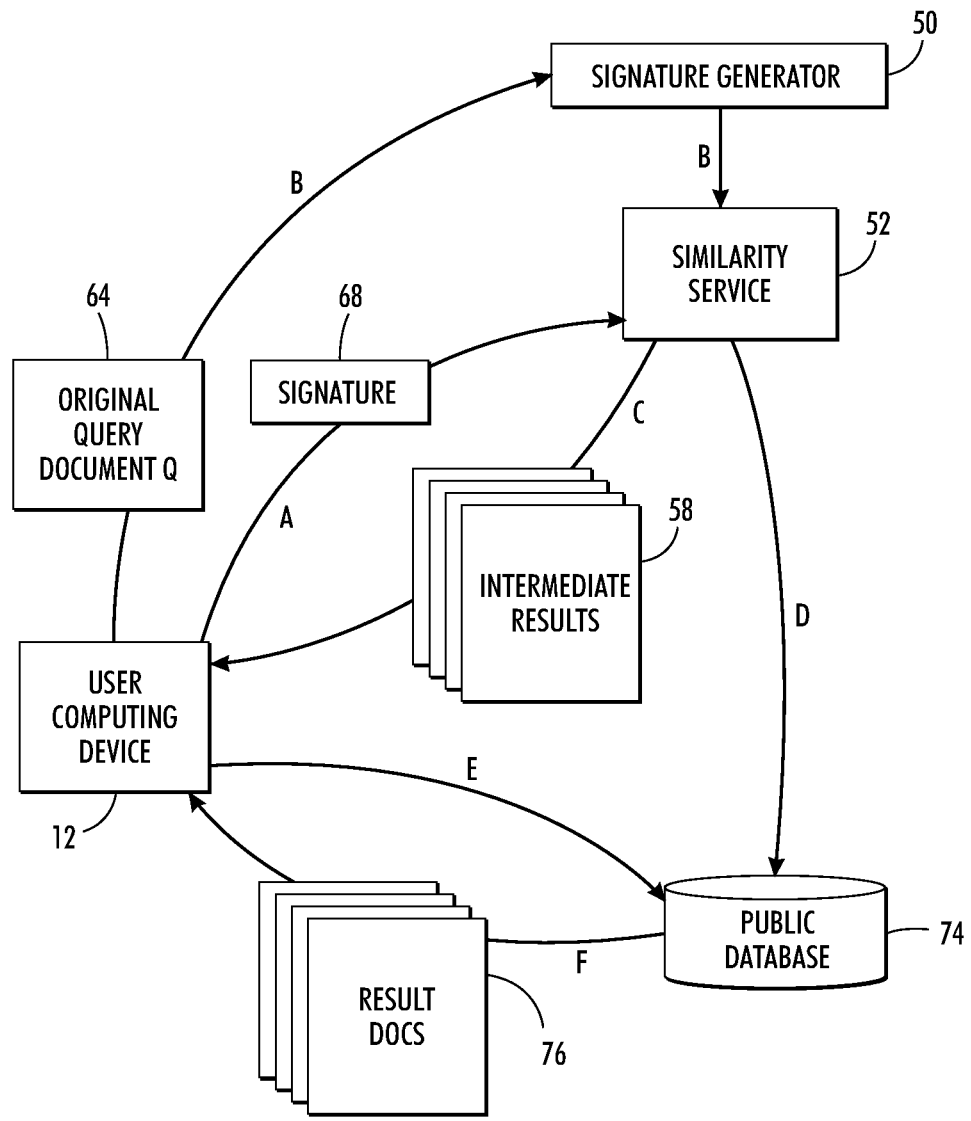

In FIG. 7, the user device submits a signature 68 to the similarity service (path A) or entire document 64 to the similarity service via the signature generator 50 (path B), which returns the intermediate set to the user device (path C) for submission to the remote service (path E) or submits it directly to the remote service 14 (path D). The remote service sends the final results set 76 directly to the user device (path F) or may return the results to the main computing device for further processing.

When submitted via path B, the original document Q may be submitted to the signature generator 50/similarity service 52, optionally via an encrypted connection. The signature computation is then computed on a device which may not be under the control of the user. In this approach, the user trusts the similarity service. This approach is useful if the client has limited processing power or the similarity service provider does not wish to provide direct access to its software. If the similarity service functions with both limited processing power clients and clients with greater processing power, another architecture is contemplated in which the entire process is a series of remote services. In addition the similarity service and remote service, a remote signature computation service, which returns a signature to be submitted to the similarity service, may be provided. The client has a local software module to submit the document to the signature computation service, may receive the signature, submit the signature to the similarity service, receive the intermediate result set, and then submit the intermediate result set to the remote service. Alternatively, each of these services may be linked in a chain or other suitable arrangement to avoid returning data repeatedly to the user.

In any of these embodiments, once the client or service extracts a signature from a query document, the rest of the process proceeds without the query document itself, only using "encrypted" versions of the document, resembling a traditional cryptographic system. The query document is never revealed to the public service, even as one of the set of documents 58. Moreover, the query document is not revealed during the intermediate database search. Once the signature is computed, the original document is no longer required. If the signature of the private document is computed by the user's computing device, there are effectively two levels of protection of the original document: (i) only a descriptor is submitted to the similarity service so the intermediate database cannot compute the original document and (ii) only the proxy results are submitted to the public database.

Caching and Offline Processing

Note that, whatever document is submitted to the intermediate database via the similarity service, a document from the intermediate database is returned. This allows a modification. Instead of the remote service 14 computing the result set 76 online, i.e., when the query is issued, the result set for each document of the intermediate database 28 may be computed offline, e.g., when a document is added to the intermediate database 28. If this processing is performed offline, then the result of the call to the remote service 14 is cached in the intermediate database indexed by the document or its signature. An advantage is that this may speed-up the query processing since the remote service 14 would not need to be called online. A disadvantage is that more data may need to be stored in the intermediate database 28 and the results from the remote service may become stale (e.g., in the case of a categorization service, a better technology might be put in place or new categories may be added to the system; in the case of a retrieval service, new documents may be added to the public database 74). A hybrid approach is simultaneously to present the results to the user based on the cached results and re-query the service to ensure that the results are unchanged. Offline processing is simple to implement when the intermediate database acts as a proxy to the remote service, although the approach may also work with the other architectures described herein.

Feature Extraction and Signature Generation

The signature generated by signature generator 50, 72 for each document 64, 58 can be any suitable high level statistical representation of the document or a part thereof, such as one page of a multiage document. The exemplary signature is in the form of a multidimensional vector generated based on features extracted from the image. Fisher Kernel representations and Bag-of-Visual-Word representations are exemplary of suitable high-level statistical representations which can be used herein as an image signature 68, 62. The exemplary image signatures 48, 56 are of a fixed dimensionality, i.e., each image signature has the same number of elements.

For example, the signature generator 46 includes a patch extractor, which extracts and analyzes low-level visual features of patches of the image, such as shape, texture, or color features, or the like. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire image, or at least a part or a majority of the image.

The extracted low-level features (in the form of a local descriptor, such as a vector or histogram) from each patch can be aggregated and optionally reduced in dimensionality, to form a features vector which serves as the global image signature. In other approaches, the local descriptors of the patches of an image are assigned to clusters. For example, a visual vocabulary is previously obtained by clustering local descriptors extracted from training images, using for instance K-means clustering analysis. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the local descriptors are emitted. Each patch can thus be characterized by a vector of posterior probabilities, one posterior probability for each of the Gaussian functions forming the mixture model. In this case, the visual vocabulary can be estimated using the Expectation-Maximization (EM) algorithm to optimize a Maximum Likelihood criterion. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, flower, autumn leaves, etc.), characteristic background (e.g., starlit sky, blue sky, grass field, snow, beach, etc.), or the like. Given an image 12, 52 to be assigned a signature 48, each extracted local descriptor is assigned to its closest visual word in the previously trained vocabulary or to all visual words in a probabilistic manner in the case of a stochastic model. A histogram is computed by accumulating the occurrences of each visual word. The histogram can serve as the image signature 48 or input to a generative model which outputs an image signature based thereon.

For example, as local descriptors extracted from the patches, SIFT descriptors or other gradient-based feature descriptors, can be used. See, e.g., Lowe, "Distinctive image features from scale-invariant keypoints," IJCV vol. 60 (2004). In one illustrative example employing SIFT features, the features are extracted from 32×32 pixel patches on regular grids (every 16 pixels) at five scales, using 128-dimensional SIFT descriptors. Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used. The number of features in each local descriptor is optionally reduced, e.g., to 64 dimensions, using Principal Component Analysis (PCA). Signatures can be computed for two or more regions of the image and aggregated, e.g., concatenated.

In some illustrative examples, a Fisher vector is computed for the image by modeling the extracted local descriptors of the image using a mixture model to generate a corresponding image vector having vector elements that are indicative of parameters of mixture model components of the mixture model representing the extracted local descriptors of the image. The exemplary mixture model is a Gaussian mixture model (GMM) comprising a set of Gaussian functions (Gaussians) to which weights are assigned in the parameter training. Each Gaussian is represented by its mean vector, and covariance matrix. It can be assumed that the covariance matrices are diagonal. See, e.g., Perronnin, et al., "Fisher kernels on visual vocabularies for image categorization" in CVPR (2007). Methods for computing Fisher vectors are more fully described in application Ser. No. 12/890,789 filed on Sep. 27, 2010, entitled IMAGE CLASSIFICATION EMPLOYING IMAGE VECTORS COMPRESSED USING VECTOR QUANTIZATION, by Jorge Sánchez, et al., application Ser. No. 12/859,898, filed on Aug. 20, 2010, entitled LARGE SCALE IMAGE CLASSIFICATION, by Florent Perronnin, et al., and in Jorge Sánchez, and Thomas Mensink, "Improving the fisher kernel for large-scale image classification," in *Proc. 11th European Conference on Computer Vision* (ECCV): Part IV, pages 143-156 (2010), and in Jorge Sánchez and Florent Perronnin, "High-dimensional signature compression for large-scale image classification," in CVPR 2011, the disclosures of which are incorporated herein by reference in their entireties. The trained GMM is intended to describe the content of any image within a range of interest (for example, any color photograph if the range of interest is color photographs).

Other methods for computing image signatures, computing similarity, and classifying images based on their signatures are described in the following references, the disclosures of which are incorporated herein by reference in their entireties: US Pub. No. 20030021481, published Jan. 30, 2003, entitled IMAGE RETRIEVAL APPARATUS AND IMAGE RETRIEVING METHOD, by E. Kasutani; U.S. Pub. No. 2007005356, published Jan. 4, 2007, entitled GENERIC VISUAL CATEGORIZATION METHOD AND SYSTEM, by Florent Perronnin; U.S. Pub. No. 20070258648, published Nov. 8, 2007, entitled GENERIC VISUAL CLASSIFICATION WITH GRADIENT COMPONENTS-BASED DIMENSIONALITY ENHANCEMENT, by Florent Perronnin; U.S. Pub. No. 20080069456, published Mar. 20, 2008, entitled BAGS OF VISUAL CONTEXT-DEPENDENT WORDS FOR GENERIC VISUAL CATEGORIZATION, by Florent Perronnin; U.S. Pub. No. 20080317358, published Dec. 25, 2008, entitled CLASS-BASED IMAGE ENHANCEMENT SYSTEM, by Marco Bressan, et al.; U.S. Pub. No. 20090144033, published Jun. 4, 2009, entitled OBJECT COMPARISON, RETRIEVAL, AND CATEGORIZATION METHODS AND APPARATUSES, by Yan Liu, et al.; U.S. Pub. No. 20100226564, entitled FRAMEWORK FOR IMAGE THUMBNAILING BASED ON VISUAL SIMILARITY, published Sep. 9, 2010, by Luca Marchesotti, et al., U.S. Pub. No. 20100040285, published Feb. 18, 2010, entitled SYSTEM AND METHOD FOR OBJECT CLASS LOCALIZATION AND SEMANTIC CLASS BASED IMAGE SEGMENTATION, by Gabriela Csurka, et al.; U.S. Pub. No. a 20100092084, published Apr. 15, 2010, entitled REPRESENTING DOCUMENTS WITH RUNLENGTH HISTOGRAMS, by Florent Perronnin, et al.; U.S. Pub. No. 20100098343, published Apr. 22, 2010, entitled MODELING IMAGES AS MIXTURES OF IMAGE MODELS, by Florent Perronnin, et al.; U.S. Pub. No. 20100191743, published Jul. 29, 2010, entitled CONTEXTUAL SIMILARITY MEASURES FOR OBJECTS AND RETRIEVAL, CLASSIFICATION, AND CLUSTERING USING SAME, U.S. Pub. No. 20100189354, published Jul. 29, 2010, entitled MODELING IMAGES AS SETS OF WEIGHTED FEATURES, by Teofilo E. de Campos, et al.; U.S. Pub. No. 20100318477, published Dec. 16, 2010, entitled FAST AND EFFICIENT NONLINEAR CLASSIFIER GENERATED FROM A TRAINED LINEAR CLASSIFIER, by Florent Perronnin, et al., U.S. Pub. No. 20110026831, published Feb. 3, 2011, entitled COMPACT SIGNATURE FOR UNORDERED VECTOR SETS WITH APPLICATION TO IMAGE RETRIEVAL by Florent Perronnin, et al.; U.S. Pub. No. 20110040711, published Feb. 17, 2011, entitled TRAINING A CLASSIFIER BY DIMENSION-WISE EMBEDDING OF TRAINING DATA, by Florent Perronnin, et al.; U.S. Pub. No. 20110052063, published Mar. 3, 2011, entitled CONSISTENT HIERARCHICAL LABELING OF IMAGE AND IMAGE REGIONS, by Julian McAuley, et al., U.S. Pub. No. 20110091105, published Apr. 21, 2011, entitled BAGS OF VISUAL CONTEXT-DEPENDENT WORDS FOR GENERIC VISUAL CATEGORIZATION, by Florent Perronnin; U.S. patent application Ser. No. 12/693,795, filed on Jan. 26, 2010, entitled A SYSTEM FOR CREATIVE IMAGE NAVIGATION AND EXPLORATION, by Sandra Skaff, et al.; U.S. application Ser. No. 12/859,898, filed on Aug. 20, 2010, entitled LARGE SCALE IMAGE CLASSIFICATION, by Florent Perronnin, et al.; U.S. application Ser. No. 12/890,789, filed on Sep. 27, 2010, entitled IMAGE CLASSIFICATION EMPLOYING IMAGE VECTORS COMPRESSED USING VECTOR QUANTIZATION, by Jorge Sánchez, et al., Jorma Laaksonen, Markus Koskela, and Erkki Oja, "PicSOM self-organizing image retrieval with MPEG-7 content descriptions," IEEE Transactions on Neural Networks, vol. 13, no. 4, 2002; Gabriela Csurka, et al., "Visual Categorization with Bags of Keypoints," European Conf. on Computer Vision (ECCV) Workshop on Statistical Learning in Computer Vision (2004); Perronnin, F., Dance, C., Csurka, G., and Bressan, M., "Adapted Vocabularies for Generic Visual Categorization," in ECCV 2006; Perronnin, F., Dance, C., "Fisher Kernels on Visual Vocabularies for Image Categorization," in Proc. of the IEEE Conf. on Computer Vision and Pattern Recognition (CVPR) (June 2007); Herve Jegou, Matthijs Douze, and Cordelia Schmid, "Hamming embedding and weak geometric consistency for large scale image search," in ECCV 2008; Yan-Tao Zheng, Ming Zhao, Yang Song, H. Adam, U. Buddemeier, A. Bissacco, F. Brucher, Tat-Seng Chua, and H. Neven, "Tour the World: Building a web-scale landmark recognition engine," IEEE Computer Society Conference, 2009; Herve Jegou, Matthijs Douze, and Cordelia Schmid, "Improving Bag-Of-Features for Large Scale Image Search," in IJCV, 2010; Perronnin, J. Sánchez, and T. Mensink, "Improving the Fisher kernel for large-scale image classification," in ECCV 2010, and Jorge Sanchez and Florent Perronnin, "High-dimensional signature compression for large-scale image classification," in CVPR 2011.

As described above, for visual documents, local descriptors such as textures, color or shape features are extracted and aggregated into a document-level descriptor (signature) using, for instance, the Fisher vector framework. For audio documents, similarly, from audio features, local features can be extracted. These can be features which describe a short time-span (a few tens of milliseconds) such as mel-frequency cepstrum (MFCC) features. These local features can be aggregated, for example, using the Fisher vector framework.

Without intending to limit the scope of the exemplary embodiment, the following Examples demonstrate the applicability of the method to documents which include images.

EXAMPLES

A small-scale query-by-example retrieval service offers a simple example of the robustness of the exemplary method. To simulate a service that, given an image as input, returns the most similar images contained in the dataset, the INRIA (Institut National de Recherche en Informatique et en Automatique) Holidays benchmark dataset (http://lear.inrialpes.fr/~jegou/data.php#holidays) was used as the remote service database 74. The INRIA Holidays Benchmark contains 1,491 images of 500 scenes. To establish a benchmark result, the first image of each scene was used in turn to query within the remaining 1,490 images, and the accuracy was measured with the Average Precision (AP). The final measure of performance is the average AP over the 500 queries, denoted mean AP (mAP). Two 2,048-dimension Fisher vectors (FV) were concatenated to provide the signatures: one Fisher Vector computed over gradient descriptors and one Fisher Vector computed over color descriptors. The final signature was a 4,096-dimensional vector. With such features, querying the database directly with the first image of each scene provided a mAP of approximately 76%.

The intermediate dataset 28 was the training set of the ImageNet Large Scale Visual Recognition Challenge (ILSVRC) 2010 dataset, which contains 1.2M images. Note that the INRIA Holidays dataset contains mostly images of scenes while the ILSVRC 2010 dataset contains mostly images of objects (plus a few images of scenes). Hence, there is a strong mismatch between these two datasets.

Using the query image (the first image of each scene) replaced by its closest match (K=1) in the intermediate dataset (INRIA), the residual error is simply the distance between the query and its closest match. The system was able to "obfuscate" roughly 50% of the query images while rejecting any match that degraded below 76%. This number could be improved by using a dataset that contained images which better reflect the target remote service database 74 or by using a larger intermediate dataset.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of querying a remote service without revealing a private document to the remote service, comprising:
    at a main computer, receiving from a client a signature generated from a user's private document, without receiving the document;
    querying an intermediate database with the signature of the private document to generate an intermediate result set comprising intermediate database documents, based on a computation of similarity of the signatures of the intermediate database documents to the signature of the private document;
    computing a relevance factor for each document of the intermediate result set;
    computing a reconstruction error based on the relevance factors of all the documents in the intermediate result set and determining a confidence in the intermediate result set based on the reconstruction error;
    querying the remote service with a query which is based on the intermediate result set, whereby the user's private document and the signature of the private document are not revealed to the remote service;
    receiving a final result set from the remote service based on the query; and
    weighting the final result set based on the relevance factors.

2. The method of claim 1, wherein the private document comprises at least one of an image, a sound recording, and text.

3. The method of claim 1, wherein each signature is a statistical representation of features extracted from the respective document.

4. The method of claim 3, wherein the documents comprise images and the features are extracted from patches of an image of the respective document.

5. The method of claim 3, wherein each signature comprises a Fisher vector.

6. The method of claim 1, wherein the remote service provides a similar document search and the final result set comprises a set of documents retrieved from a public database, based on their similarity to the documents in intermediate result set.

7. The method of claim 1, wherein the remote service provides a category of document search and the final result set comprises category labels for the documents in intermediate result set.

8. The method of claim 1, further comprising warning a user when a confidence in the intermediate result set is not above a threshold confidence.

9. The method of claim 1, wherein the computation of the relevance factors is based on coefficients that minimize the reconstruction error between the signatures of the documents of the intermediate result set and the signature of the private document.

10. The method of claim 1, further comprising the client computing the private document signature.

11. The method of claim 1, wherein the final result set comprises a set of documents.

12. The method of claim 1, further comprising, caching a result set for each document in the intermediate database by submitting the respective intermediate database document to the remote service and wherein querying the remote service based on the intermediate result set comprises retrieving the cached result set for each document in the intermediate result set and generating the final result set based on the retrieved cached result sets.

13. The method of claim 1, wherein the querying of the remote service based on the intermediate result set comprises generating a query with each document in the intermediate result set and submitting the queries to the remote service.

14. The method of claim 1, wherein the querying of the intermediate database with the signature is performed with a computer processor.

15. A computer program product comprising a non-transitory recording medium which stores instructions, which when executed by a computer, perform the method of claim 1.

16. A system comprising memory which stores instructions for performing the method of claim 1, and a processor in communication with the memory, for executing the instructions.

17. A computer implemented querying system comprising:
    a signature generator, located on a client, for generating a signature for a user's private document;
    a similarity service, located on a server, which receives the generated signature of the private document, without receiving the private document, and queries an intermediate database with the generated signature to produce an intermediate result set comprising documents, the similarity service computing a relevance factor for each document of the intermediate result set, a reconstruction error based on the relevance factors of the documents in the intermediate result set, and a confidence in the intermediate result set based on the reconstruction error;

a submitting component which submits the intermediate result set to an associated remote service for producing a final result set based on the intermediate result set, the submitting component weighting the final result set based on the relevance factors; and at least one processor which implements the signature generator and similarity service.

18. The system of claim 17, wherein the final result set comprises a set of documents retrieved from a public database, based on the documents in the intermediate result set.

19. A method of querying a remote service for results similar to results which would be produced by querying the remote service with a private document without revealing the private document to the remote service comprising:

querying a similarity service with the private document, the similarity service querying an intermediate database with a signature generated from the private document which is compared to signatures of documents stored in the intermediate database to produce an intermediate result set comprising documents, the intermediate result set being ranked by the similarity of the signature of each document of the intermediate result set to the signature of the private document;

receiving the ranked intermediate result set from the similarity service;

computing a relevance factor for each document of the intermediate result set;

computing a reconstruction error based on the relevance factors of all the documents in the intermediate result set and a confidence in the intermediate result set based on the reconstruction error;

querying the remote service with a query set derived from the intermediate result set;

receiving a final result set of documents; and outputting the final result set of documents, the final result set being weighted based on the relevance factors.

20. The method of claim 19, wherein the documents of the final result set are ordered based on the rankings of the intermediate result set.

21. The method of claim 20, wherein the computation of similarity of signatures is performed on the same computing device as computation of the private document signature.

\* \* \* \* \*